(12) United States Patent
Nagakura

(10) Patent No.: US 11,970,145 B2
(45) Date of Patent: Apr. 30, 2024

(54) BRAKE SYSTEM FOR A TWO-AXLE VEHICLE AND METHOD FOR THE OPERATION THEREOF

(71) Applicant: Robert Bosch GmbH, Stuttgart (DE)

(72) Inventor: Yasutaka Nagakura, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 871 days.

(21) Appl. No.: 16/981,886

(22) PCT Filed: Mar. 7, 2019

(86) PCT No.: PCT/EP2019/055686
§ 371 (c)(1),
(2) Date: Sep. 17, 2020

(87) PCT Pub. No.: WO2019/197084
PCT Pub. Date: Oct. 17, 2019

(65) Prior Publication Data
US 2021/0001827 A1    Jan. 7, 2021

(30) Foreign Application Priority Data

Apr. 12, 2018    (DE) .......................... 102018205520.3

(51) Int. Cl.
*B60T 13/66*    (2006.01)
*B60T 13/68*    (2006.01)
*B60T 13/74*    (2006.01)

(52) U.S. Cl.
CPC ............ *B60T 13/662* (2013.01); *B60T 13/68* (2013.01); *B60T 13/745* (2013.01);
(Continued)

(58) Field of Classification Search
CPC ............................... B60T 13/662; B60T 13/68
(Continued)

(56) References Cited

U.S. PATENT DOCUMENTS

| | | | |
|---|---|---|---|
| 9,539,990 B2 * | 1/2017 | Strengert | B60T 13/662 |
| 2011/0004385 A1 * | 1/2011 | Ishimoto | B60T 7/12 |
| | | | 188/106 F |

(Continued)

FOREIGN PATENT DOCUMENTS

| | | |
|---|---|---|
| CN | 104837697 A | 8/2015 |
| DE | 4427170 C1 | 10/1995 |

(Continued)

OTHER PUBLICATIONS

International Search Report for PCT/EP2019/055686, dated Jun. 3, 2019.

*Primary Examiner* — Peter D Nolan
*Assistant Examiner* — Luke Huynh
(74) *Attorney, Agent, or Firm* — NORTON ROSE FULBRIGHT US LLP; Gerard A. Messina

(57) ABSTRACT

A brake system for a two-axle vehicle having a master brake cylinder. The brake system includes at least one connected brake circuit, each having front and rear wheel brake cylinders, front wheel inlet and outlet valves, rear wheel inlet and outlet valves, an accumulator chamber, and a control device via which, by opening the at least one rear wheel outlet valve, a brake fluid pressed out of master brake cylinder is displaceable via the open rear wheel outlet valve into the respectively downstream disposed accumulator chamber. When the at least one front wheel outlet valve is kept closed or closed, the control device is configured to increase and limit a brake pressure prevailing in the respectively associated front wheel brake cylinder to an accumulator chamber pressure actively prevailing in the accumulator chamber of the same brake circuit by keeping open or opening the at least one front wheel inlet valve.

10 Claims, 2 Drawing Sheets

(52) U.S. Cl.
CPC ... *B60T 2201/124* (2013.01); *B60T 2270/604* (2013.01); *B60Y 2400/81* (2013.01)

(58) Field of Classification Search
USPC .......................................................... 701/70
See application file for complete search history.

(56) References Cited

U.S. PATENT DOCUMENTS

| | | | |
|---|---|---|---|
| 2011/0233994 A1 | 9/2011 | Harding et al. | |
| 2014/0319902 A1* | 10/2014 | Benzler | B60T 13/662 |
| | | | 303/6.01 |
| 2015/0336551 A1* | 11/2015 | Okano | B60T 13/142 |
| | | | 701/70 |
| 2020/0216052 A1* | 7/2020 | Campau | B60T 13/745 |

FOREIGN PATENT DOCUMENTS

| | | |
|---|---|---|
| DE | 10336047 A1 | 2/2004 |
| DE | 102012222974 A1 | 6/2014 |
| DE | 102014211661 A1 | 12/2015 |
| JP | 2015523259 A | 8/2015 |
| WO | 2013115166 | 8/2013 |

\* cited by examiner

BRAKE SYSTEM FOR A TWO-AXLE VEHICLE AND METHOD FOR THE OPERATION THEREOF

FIELD

The present invention relates to a brake system for a two-axle vehicle. The present invention also relates to a method for operating a brake system of a two-axle vehicle.

BACKGROUND INFORMATION

German Patent Application No. DE 10 2012 222 974 A1 describes a method for operating a brake system of a vehicle and a control device for a brake system of a vehicle. In an implementation of the method for operating a brake system of a vehicle, respectively in the case of a use of the corresponding control device, a brake pressure build-up in the brake circuits of the brake system is limited at least periodically to a response pressure of the storage volume thereof by the rear wheel outlet valves of the rear wheel brake cylinders being controlled into the open state thereof during an actuation of a brake actuating element. Moreover, during control of the rear wheel outlet valves into the open state thereof, the front wheel inlet valves of the front wheel brake cylinders are controlled into the closed state thereof to ensure a brake pressure of (virtually) zero in the front wheel brake cylinders. Furthermore, German Patent Application No. DE 10 2012 222 974 A1 suggests that the brake system used in each particular case be equipped with at least one storage volume having a relatively high response pressure.

SUMMARY

The present invention provides a brake system for a two-axle vehicle and a method for operating a brake system of a two-axle vehicle.

Example embodiments of the present invention make possible an advantageous counteraction to prevent/eliminate state changes on at least one element of at least one front wheel brake cylinder of the particular brake system connected to a master brake cylinder. In particular, the present invention is able to quickly eliminate those state changes which are attributable to the respective front wheel brake cylinder getting wet or not being used. The brake pressure build-up in the respective front wheel brake cylinder that may be brought about by the present invention makes it possible, in particular to prevent/eliminate an undesired change in/deterioration of a ratio between a friction braking torque effected by the particular front wheel brake cylinder and a brake pressure prevailing in the respective front wheel brake cylinder. Thus, the present invention may ensure that the particular front wheel brake cylinder is still in an advantageous state for subsequent brake actuations, even after a relatively long period of use.

The brake pressure build-up in the particular front wheel brake cylinder effected by the present invention may be achieved without loss of a possible recuperative braking (respectively, without any reduction in a recuperative efficiency maintained during the recuperative braking). Another advantage of the present invention over the related art is that the brake pressure build-up effected by the present invention is possible without a pumping of brake fluid and without a switching of a changeover valve or of a high pressure control valve. Thus, a driver of a vehicle, which utilizes the present invention, will neither be disturbed/irritated by noises nor by a vibration/shaking of his/her brake actuating element during the inventive build-up of brake pressure in the respective front wheel brake cylinder. Thus, the present invention also enhances the driver's comfort.

The brake pressure build-up in the respective front wheel brake cylinder effected by the present invention may be used as what is commonly known as a brake disk wiping function (BDW function). It is again noted that the "brake disk wiping function according to the present invention" does not require any pumping of brake fluid nor any switching of a changeover valve or of a high pressure control valve. These are significant advantages over a conventional brake disk wiping function, which generally requires operation of a pump, usually at a pump speed of between 1,500 rpm (revolutions per minute) to 2,000 rpm (revolutions per minute) to effect the desired brake pressure build-up quickly enough.

It should be appreciated that example embodiments of the present invention may also prevent aging damage, damage due to wear, corrosion damage, and damage due to thermal stresses from occurring on the particular front wheel brake cylinder or eliminate the same in a timely manner. Thus, the present invention is able to enhance a service life or service period of the front wheel brake cylinder. Therefore, the present invention makes it possible to save repair costs and spare parts costs.

Conditioning the respective front wheel brake cylinder in accordance with the present invention makes it possible, in particular to reliably prevent/eliminate corrosion of a brake disk, corrosion of a brake drum or glazing of brake linings. Thus, conditioning the front wheel brake cylinder makes it possible to ensure that an advantageous efficiency thereof is retained. A maximum braking action of the respective front-wheel brake cylinder may thus continue to be retrieved in an emergency braking situation, in particular. There is, therefore, no risk of the proportionality constant of the respective front-wheel brake cylinder deteriorating undesirably.

In an advantageous specific embodiment of the brake system according to the present invention, if the control device is able to discern or effect that the generator operation of the at least one electric motor is able to effect or effects that the recuperative vehicle deceleration equals the input target vehicle deceleration, the control device is configured to first close the at least one front wheel inlet valve before or simultaneously with the opening of the at least one rear wheel outlet valve and, later, to open the same in the case that the front wheel outlet valve of the same brake circuit is in a closed state and the rear wheel outlet valve of the same brake circuit is in an open state. For example, the control device is configured to open the at least one front wheel inlet valve, which is closed before or simultaneously with the opening of the at least one rear wheel outlet valve, in the case that the front wheel outlet valve of the same brake circuit is in a closed state and the rear wheel outlet valve of the same brake circuit is in an open state, as soon as a specified delay has elapsed following the closing of the at least one front wheel inlet valve and/or following the opening of the at least one rear wheel outlet valve, and/or as soon as a measured or estimated pressure in the respective brake circuit is in a normal value range of accumulator chamber pressures prevailing in the accumulator chamber thereof. This ensures that the respective front wheel inlet valve is only opened after the brake fluid pressed out of the master brake cylinder is transferred via the open rear wheel outlet valve into the accumulator chamber of the brake circuit thereof, and thus that the brake pressure built up in the respective front wheel brake cylinder suffices for a brake disk wiping function, but does not cause excessive braking retardation of the respective vehicle (beyond the target vehicle deceleration input by the driver).

The brake system is preferably designed as a recuperative brake system having the at least one electric motor; in the event of an actively input target vehicle deceleration unequal to zero, the control device being configured to discern whether the generator operation of the at least one electric motor is able to effect that the recuperative vehicle deceleration equals the input target vehicle deceleration and, optionally, to drive the at least one electric motor to effect the input target vehicle deceleration. Since the pressure built up in the front wheel brake cylinders for executing a brake disk wiping function generally resides in a normal value range of between 1.2 bar and 1.6 bar, the braking effected by the cooperation of the control device and the at least one electric motor is not/is hardly impaired by the simultaneously executed brake disk wiping function. Thus, the driver generally does not notice any deviating vehicle behavior/ braking behavior.

In accordance with an example embodiment of the present invention, the advantages described above are also realized by implementing a corresponding method for operating a brake system of a two-axle vehicle. It should be appreciated that the method for operating a brake system of a two-axle vehicle may be further refined in accordance with the specific embodiments of the brake system explained above.

An advantageous specific embodiment of the method in accordance with the present invention provides that the method step of keeping open or opening the at least one front wheel inlet valve be performed cyclically and/or starting from a determination of at least one specified indicator of a non-compliance with a specified minimum utilization of the at least one front wheel brake cylinder and/or in response to a state of at least one element of the at least one front wheel brake cylinder deviating from a normal state. Cyclical execution may be understood both as execution after exceeding a time threshold and execution after exceeding a threshold number/minimum number of braking operations (in particular braking operations by effecting a recuperative vehicle deceleration that is equal to the input target vehicle deceleration).

For example, as the at least one specified indicator of a deviation of the state of the at least one element of the at least one front wheel brake cylinder from the normal state, it may be ascertained whether there is corrosion, wear, liquid wetting, liquid penetration, glazing, thermal overstressing and/or aging of the at least one element of the at least one front-wheel brake cylinder. Also, non-use of the vehicle for a relatively long period of time may be established as the at least one specified indicator. It is optionally possible to quickly and reliably eliminate corrosion, wear and/or obsolescence of at least one element of the respective front wheel brake cylinder caused by the increased use thereof.

Alternatively or in addition thereto, as the at least one specified indicator of a deviation of the state of the at least one element of the at least one front wheel brake cylinder from the normal state, it may be ascertained in each case whether a ratio between an actual friction braking torque of the respective front wheel brake cylinder and an actual brake pressure prevailing in the respective front wheel brake cylinder deviates from a specified normal ratio. Such an evaluation is feasible using electronics that are relatively inexpensive and require relatively little installation space. Moreover, to determine the at least one actual pressure and the at least one associated actual friction braking torque, it is possible to use sensors that are generally already installed on a vehicle. Thus, a feasibility of the method described here is already ensured without the need for additional sensors or inexpensive, relatively large volume electronics. If indicated, the present invention may again readily and rapidly ensure that the ratio between the actual friction braking torque of the respective front wheel brake cylinder and the actual brake pressure prevailing in the respective front wheel brake cylinder is adapted to the specified normal ratio.

The method steps described in above may also be carried out by the control device explained above.

BRIEF DESCRIPTION OF THE DRAWINGS

Other features and advantages of the present invention are explained in greater detail below with reference to the figures.

DETAILED DESCRIPTION OF EXAMPLE EMBODIMENTS

Figure 1A:
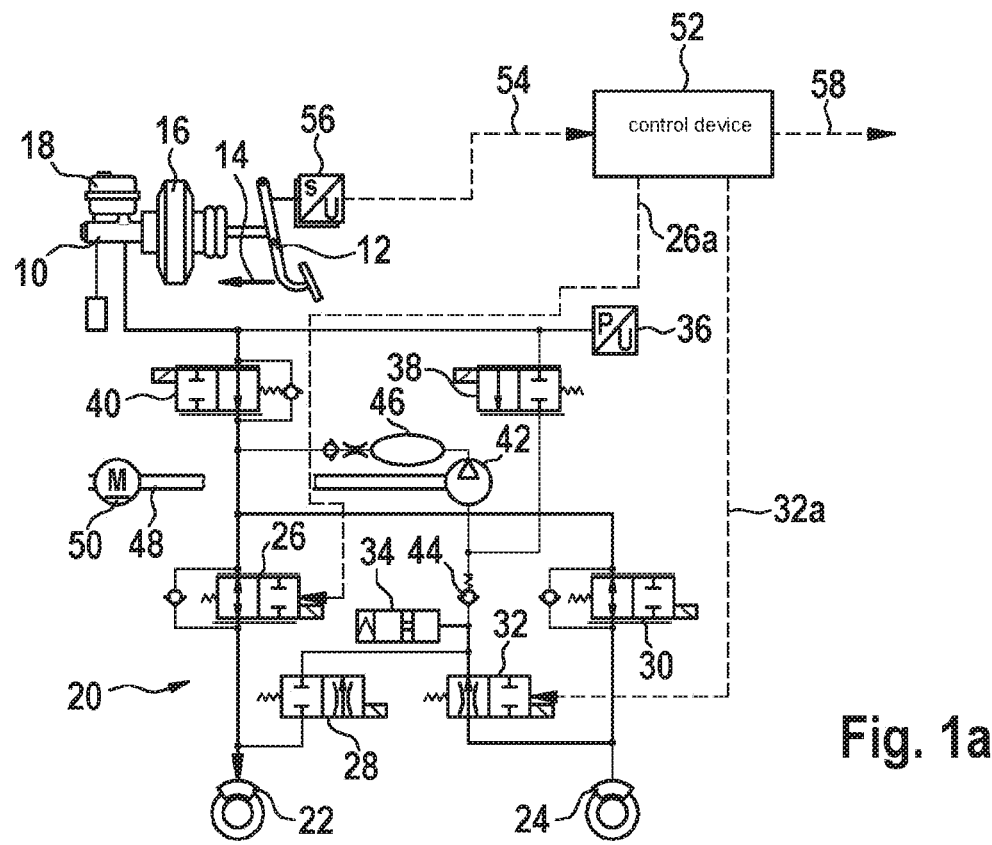
FIGS. 1a and 1b schematically represent a specific embodiment of the brake system and a coordinate system for clarifying the principle of operation thereof in accordance with the present invention.
Figure 1B:
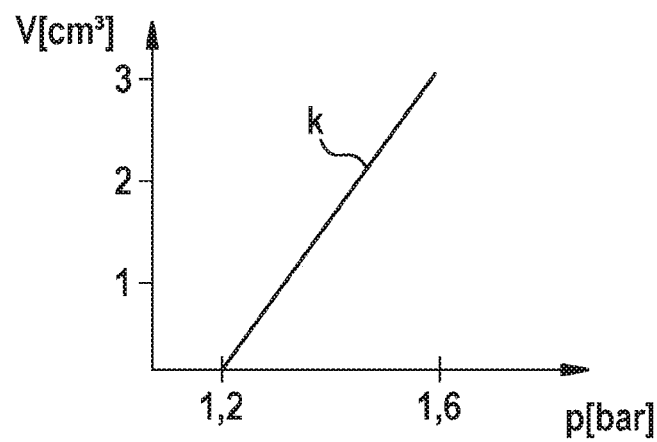

FIGS. 1a and 1b schematically represent a specific example embodiment of the brake system and a coordinate system for clarifying the principle of operation thereof, in accordance with the present invention.

The brake system schematically rendered in FIG. 1a is designed for use in a two-axle vehicle/motor vehicle. The particular vehicle/motor vehicle is designed to include at least one electric motor (not shown) in such a way that a generator operation of the at least one electric motor may retard/retards the vehicle/motor vehicle. Thus, the vehicle/ motor vehicle may be configured as an electric or hybrid vehicle. However, a usability of the brake system described in the following is not limited to a specific vehicle/motor vehicle type.

The brake system has a master brake cylinder 10 to which a brake actuating element 12 may be/is connected in such a way that a target vehicle deceleration desired by a driver of the vehicle may be/is input by actuating brake actuating element 12 through application of a (schematically rendered) driver braking force 14. A brake booster 16 and/or a brake fluid reservoir 18 may also be optionally connected to master brake cylinder 10.

Moreover, the brake system has at least one brake circuit 20 connected to master brake cylinder 10. In the example of FIG. 1a, the brake system has two brake circuits 20, which are connected to master brake cylinder 10 and of which only one is shown in FIG. 1a. However, brake circuit 20 (not shown) is preferably identical in design to illustrated brake circuit 20. (Alternatively, brake circuit 20 (not shown) may also be decoupled or decouplable from master brake cylinder 10.)

The at least one brake circuit 20 connected to master brake cylinder 10, which in each case includes one front wheel brake cylinder 22, one rear wheel brake cylinder 24, one front wheel inlet valve 26 associated with respective front wheel brake cylinder 22, one front wheel outlet valve 28 associated with respective front wheel brake cylinder 22, one rear wheel inlet valve 30 associated with respective rear wheel brake cylinder 24, one rear wheel outlet valve 32 associated with respective rear wheel brake cylinder 24, and one accumulator chamber 34 disposed downstream of respective front wheel outlet valve 28 and respective rear wheel outlet valve 32. In addition, the at least one brake circuit 20 connected to master brake cylinder 10, in particular each of brake circuits 20 connected to master brake cylinder 10 may also be equipped with a pressure sensor 36, a high pressure control valve 38, a changeover valve 40, at least one pump 42, a nonreturn valve/pressure relief valve 44 disposed between respective accumulator chamber 34 and a suction side of the at least one pump 42, and/or a filter 46 disposed on the delivery side of the at least one pump 42. Pumps 42 of brake circuits 20 may optionally be located on a common shaft 48 of a motor 50.

Respective accumulator chamber 34 of the at least one brake circuit 20 connected to master brake cylinder 10 is preferably a low-pressure accumulator chamber. However, a designability of the brake system described here is not limited to a specific accumulator chamber type.

The at least one front wheel brake cylinder 22 (connected to master brake cylinder 10) is understood in each case to be a wheel brake cylinder 22 associated with a front wheel of the vehicle/motor vehicle.

Accordingly, the at least one rear wheel brake cylinder 24 (connected to master brake cylinder 10) means in each case a wheel brake cylinder 24 associated with a rear wheel of the vehicle/motor vehicle. Thus, the brake system shown in FIG. 1a having two identical brake circuits 20 has an X brake circuit configuration. A front wheel friction deceleration of the vehicle (respectively a rear wheel friction deceleration of the vehicle) is referred to as a (partial) deceleration of the vehicle induced (solely) by a pressure buildup in the at least one front wheel brake cylinder 22 connected to master brake cylinder 10 (respectively by a pressure buildup in the at least one rear wheel brake cylinder 24 connected to master brake cylinder 10). In the following, a (partial) deceleration of the vehicle effected (solely) by the generator operation of the at least one electric motor is referred to as a recuperative vehicle deceleration.

The brake system also has a control device 52 which, in response to a target vehicle deceleration unequal to zero that is input (by driver braking force 14), is able to discern or effect that the generator operation of the at least one electric motor is able to effect/effects that a recuperative vehicle deceleration (essentially) equals the input target vehicle deceleration. Optionally, i.e., if the vehicle may be/is retarded by the recuperative vehicle deceleration equaling the input target vehicle deceleration, control device 52 is configured to displace a brake fluid pressed out of master brake cylinder 10 (by driver braking force 14) via the at least one open rear wheel outlet valve 32 into the at least one downstream accumulator chamber 34 by opening the at least one rear wheel outlet valve 32 (connected to master brake cylinder 10 and driven by at least one control signal 32a). (The at least one rear wheel inlet valve 30 of the at least one brake circuit 20 connected to master brake cylinder 10 is generally open before the start of a braking. Alternatively, however, the at least one rear wheel inlet valve 30 may also be opened by control device 52 together with the respectively associated rear wheel outlet valve 32.) Opening the at least one rear wheel outlet valve 32 connected to master brake cylinder 10 limits a pressure prevailing in the at least one brake circuit 20 connected to master brake cylinder to a normal value range of accumulator chamber pressures p prevailing in accumulator chamber 34 thereof.

A standard characteristic curve k of accumulator chamber 34 sketched in FIG. 1a is plotted in coordinate system of FIG. 1b; an abscissa representing an accumulator chamber pressure p (in bar) and an ordinate a volume V (in cm³/cubic centimeters) stored in accumulator chamber 34. It is discernible that accumulator chamber pressures p prevailing in accumulator chamber 34 generally reside in a normal value range of from 1.2 bar to 1.6 bar in respective accumulator chamber 34. Limiting the pressure prevailing in the at least one brake circuit 20 connected to master brake cylinder to this normal value range prevents the vehicle from being overbraked during the braking retardation thereof by the recuperative vehicle deceleration equaling the target vehicle deceleration (input by driver braking force 14). Therefore, the vehicle is (essentially) braked solely by the generator operation of the at least one electric motor, without the input target vehicle deceleration being exceeded. Retarding the vehicle (essentially) solely by using the generator operation of the at least one electric motor makes it possible for a kinetic energy of the vehicle, which has been slowed down or brought to a standstill, to be converted into electrical energy at a high recuperation efficiency and preferably used for a later acceleration of the vehicle. In this manner, energy/fuel consumption of the vehicle may be reduced, pollutant emissions of the vehicle possibly lowered and, at the same time, good ride comfort ensured for the driver.

If the vehicle may be/is retarded by the recuperative vehicle deceleration equaling the input target vehicle deceleration, control device 52 is additionally configured to increase and limit a brake pressure prevailing in the respectively associated front wheel brake cylinder 22 to an accumulator chamber pressure p actively prevailing in accumulator chamber 34 of same brake circuit 20 in the case of at least one front wheel outlet valve 28 being kept closed or closed by the keeping open or opening of the at least one front wheel inlet valve 26 of the at least one brake circuit 20 connected to master brake cylinder 10 (via at least one control signal 26a). This is depicted in FIG. 1a. (The at least one front wheel outlet valve 28 of the at least one brake circuit 20 connected to master brake cylinder 10 generally exists in a closed state before the start of a braking and continues to be kept closed in spite of the opening or keeping open of the at least one associated front wheel inlet valve 26.)

Keeping open or opening the at least one front wheel inlet valve 26 (of the at least one brake circuit 20 connected to master brake cylinder 10) while (simultaneously) keeping closed or closing the at least one front wheel outlet valve 28 induces what is commonly known as a brake disk wiping function (BDW function). The brake disk wiping function makes it possible to reliably counteract an undesired state change on at least one element of the at least one front wheel brake cylinder 22, for example, in the case of a brake disk of the at least one front wheel brake cylinder 22 "getting wet." The slight pressure increase in respective front wheel brake cylinder 22 in response to the keeping open or opening of the at least one front wheel inlet valve 26 while (simultaneously) keeping closed or closing the at least one front wheel outlet valve 28 is sufficient to "wipe away" water from the respective brake disk. Since front wheel brake cylinders 22, in particular are often affected by the ingress of water on rainy days, they benefit from execution of the brake disk wiping function.

The technical method described here utilizes a spring force of an accumulator chamber spring used respectively in the at least one accumulator chamber 34 to effect the advantageous brake disk wiping function. As soon as the at least one front wheel inlet valve 26 is opened, the accumulator chamber spring of accumulator chamber 34 of same brake circuit 20 presses volume out of accumulator chamber 34 via opened front wheel inlet valve 26 of same brake circuit 20 into downstream front wheel brake cylinder 22. In this manner, the brake pressure build-up desired/sufficient for the brake disk wiping function in respective front wheel brake cylinder 22 is effected without pumping brake fluid and without switching changeover valve 40 or high pressure control valve 38. The brake disk wiping function may thus be performed (virtually) silently.

The brake pressure build-up desired/sufficient for the brake disk wiping function remains limited to the normal value range of accumulator chamber pressures p. Thus, the front wheel friction deceleration of the at least one front wheel brake cylinder 22 (of the at least one brake circuit 20 connected to master brake cylinder 10) remains negligibly low. (Accordingly, the rear wheel friction deceleration of the at least one rear wheel brake cylinder 24 also does not contribute/hardly contributes to the exceedance of the target vehicle deceleration input by the driver.)

The at least one front wheel inlet valve 26 of the at least one brake circuit 20 connected to master brake cylinder 10 is generally open before the start of a braking and may possibly also continue to be kept open in order to increase and limit the brake pressure prevailing in the respectively associated front wheel brake cylinder 22 to accumulator chamber pressure p actively prevailing in respectively associated accumulator chambers 34. Preferably, however, control device 52 is configured to first close the at least one front wheel inlet valve 26 of the at least one brake circuit 20 connected to master brake cylinder 10 and, later, to open the same in the case that front wheel outlet valve 28 of same brake circuit 20 is in a closed state, and rear wheel outlet valve 32 of same brake circuit 20 is in an open state, if it may be discerned or effected that the generator operation of the at least one electric motor may effect/effects that the recuperative vehicle deceleration equals the input target vehicle deceleration, before or simultaneously with the opening of the at least one rear wheel outlet valve 32 (connected to the master brake cylinder). The at least one front wheel inlet valve 26 connected to master brake cylinder 10 is preferably gradually opened, so that volume flows relatively slowly into the at least one downstream front wheel brake cylinder 22, thereby avoiding/preventing a loud noise. Otherwise, i.e., if the at least one front wheel inlet valve 26 is in a closed state before the start of a braking; control device 52 may open the at least one front wheel inlet valve 26 of the at least one brake circuit 20 connected to master brake cylinder 10, however, also together with the respectively associated rear wheel outlet valve 32 or with a time delay relative thereto, in order in this way to increase and limit the brake pressure prevailing in the respectively associated front wheel brake cylinder 22 to accumulator chamber pressure p actively prevailing in accumulator chamber 34 of same brake circuit 20.

Control device 52 may be configured, for example, to open the at least one front wheel inlet valve 26 (of the at least one brake circuit 20 connected to master brake cylinder 10), which is closed before or simultaneously with the opening of the at least one rear wheel outlet valve 32, in the case that front wheel outlet valve 28 of same brake circuit 20 is in a closed state, and rear wheel outlet valve 32 of same brake circuit 20 is in an open state, as soon as a specified delay has elapsed following the closing of the at least one front wheel inlet valve 26 and/or following the opening of the at least one rear wheel outlet valve 32, and/or as soon as a measured or estimated pressure in respective brake circuit 20 is in the normal value range of accumulator chamber pressures p prevailing in accumulator chamber 34 thereof. As an advantageous further refinement, control device 52 may also be configured to not only discern whether the generator operation of the at least one electric motor is able to effect that the recuperative vehicle deceleration equals the input target vehicle deceleration not only in the event of an actively input target vehicle deceleration unequal to zero (for example, on the basis of at least one sensor signal 54 from at least one brake actuating element sensor 56), but also (via the at least one control signal 58) to optionally drive the at least one electric motor to effect the input target vehicle deceleration.

Moreover, control device 52 may also be designed to execute the method steps described below.

Figure 2:
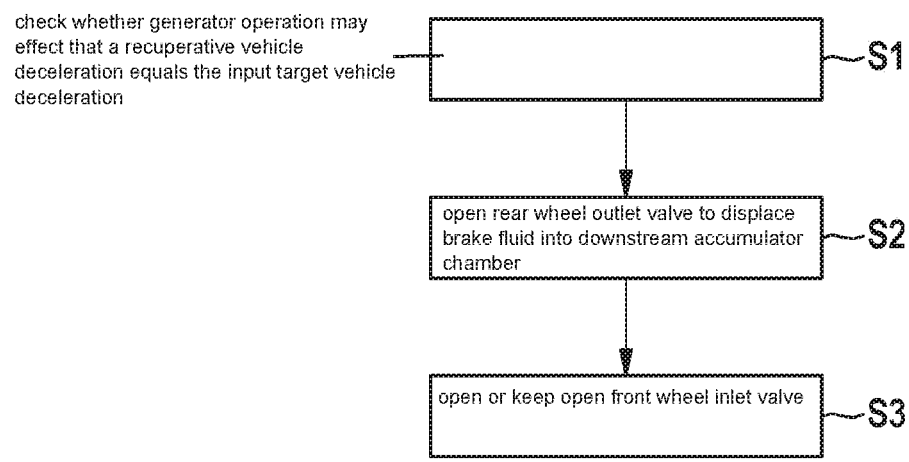
FIG. 2 is a flow chart for clarifying a specific embodiment of the method for operating a brake system of a two-axle vehicle in accordance with the present invention.

FIG. 2 shows a flow chart for clarifying a specific embodiment of the method for operating a brake system of a two-axle vehicle.

The method described in the following may be carried out using (virtually) any brake system of a two-axle vehicle/motor vehicle that is equipped with a master brake cylinder, a brake actuating element connected thereto, and at least one brake circuit connected to the master brake cylinder, in each case having at least one front wheel brake cylinder, one rear wheel brake cylinder, one front wheel inlet valve associated with the respective front wheel brake cylinder, one front wheel outlet valve associated with the respective front wheel brake cylinder, one rear wheel inlet valve associated with the respective rear wheel brake cylinder, one rear wheel outlet valve associated with the respective rear wheel brake cylinder, and one accumulator chamber downstream of the respective front wheel outlet valve and the respective rear wheel outlet valve. Thus, a feasibility of the method is neither limited to a specific brake system type nor to a specific vehicle/motor vehicle type.

In the case of a target vehicle deceleration input by a driver of the vehicle by actuating the brake actuating element, method step S1 checks whether a generator operation of at least one electric motor of the vehicle may effect that a recuperative vehicle deceleration equals the input target vehicle deceleration. If the generator operation of the at least one electric motor is able to effect (and preferably also effects accordingly) that a recuperative vehicle deceleration equals the input target vehicle deceleration, this at least triggers a method step S2. As method step S2, brake fluid pressed out of the master brake cylinder is displaced via the at least one open rear wheel outlet valve into the respectively downstream disposed accumulator chamber in response to opening of the at least one rear wheel outlet valve. (The at least one rear wheel inlet valve 30 of the at least one brake circuit 20 connected to master brake cylinder 10 is either already open or may be opened together with the respectively associated rear wheel outlet valve.)

Along with method step S2, a method step S3 is also carried out (at least sometimes). As method step S3, when the at least one front wheel outlet valve is kept closed or closed, the at least one front wheel inlet valve is kept open or opened so that a brake pressure prevailing in the respectively associated front wheel brake cylinder is increased and limited to an accumulator chamber pressure actively prevailing in the accumulator chamber of the same brake circuit. Thus, the method described here also brings about the advantages already clarified above. If discerned (and preferably also effected) that the generator operation of the at least one electric motor is able to effect that the recuperative vehicle deceleration equals the input target vehicle deceleration, before or simultaneously with the opening of the at least one rear wheel outlet valve, the at least one front wheel outlet valve is first closed and later opened when the front wheel outlet valve of the same brake circuit is in a closed state and the rear wheel outlet valve of the same brake circuit is in an open state. In this case, the at least one front wheel inlet valve, which is closed before or simultaneously with the opening of the at least one rear wheel outlet valve, is preferably opened in the case that the front wheel outlet valve of the same brake circuit is closed and the rear wheel outlet valve of the same brake circuit is open, as soon as a specified delay has elapsed following the closing of the at least one front wheel inlet valve and/or following the opening of the at least one rear wheel outlet valve, and/or as soon as a measured or estimated pressure in the respective brake circuit is in a normal value range of accumulator chamber pressures prevailing in the accumulator chamber thereof.

Method step S3 (i.e., keeping open or opening the at least one front wheel inlet valve) may be executed cyclically and/or starting from a determination of at least one specified indicator of a non-compliance with a specified minimum utilization of the at least one front wheel brake cylinder and/or for a deviation of a state of at least one element of the at least one front wheel brake cylinder from a normal state. A cyclical execution of method step S3 may be understood to be both an execution upon exceedance of a time threshold (starting from a last executed method step S3), as well as an execution of method step S3 upon exceedance of a threshold number/minimum number of braking operations (in particular braking operations by inducing a recuperative vehicle deceleration equal to the input target vehicle deceleration) carried out without method step S3.

For example, as the at least one specified indicator of a deviation of the state of the at least one element of the at least one front wheel brake cylinder from the normal state, it is ascertained whether there is corrosion, wear, liquid wetting, liquid penetration, glazing, thermal overstressing and/or aging of the at least one element of the at least one front-wheel brake cylinder. In the same way, as the at least one specified indicator of a deviation of the state of the at least one element of the at least one front wheel brake cylinder from the normal state, it may be ascertained in each case whether a ratio between an actual friction braking torque of the respective front wheel brake cylinder and an actual brake pressure prevailing in the respective front wheel brake cylinder deviates from a specified normal ratio.

What is claimed is:

1. A brake system for a two-axle vehicle, comprising:
    a master brake cylinder to which a brake actuating element is connected in such a way that a target vehicle deceleration desired by a driver of the vehicle is input by actuating the brake actuating element;
    at least one brake circuit which is connected to the master brake cylinder, each of the at least one brake circuit having a respective front wheel brake cylinder, a respective rear wheel brake cylinder, a respective front wheel inlet valve associated with the respective front wheel brake cylinder, a respective front wheel outlet valve associated with the respective front wheel brake cylinder, a respective rear wheel inlet valve associated with the respective rear wheel brake cylinder, a respective rear wheel outlet valve associated with the respective rear wheel brake cylinder and a respective accumulator chamber downstream of the respective front wheel outlet valve and the respective rear wheel outlet valve; and
    a control device which, in response to an actively input target vehicle deceleration unequal to zero, is able to discern or effect that a generator operation of at least one electric motor of the vehicle is able to effect a recuperative vehicle deceleration that is equal to the input target vehicle deceleration, and which is configured to optionally displace a brake fluid pressed out of the master brake cylinder via the respective rear wheel outlet valve into the respective downstream disposed accumulator chamber by opening the respective rear wheel outlet valve;
    wherein, when the respective front wheel outlet valve is kept closed or closed, the control device is configured to optionally increase and limit a brake pressure prevailing in the respective associated front wheel brake cylinder to an accumulator chamber pressure actively prevailing in the respective accumulator chamber of the same brake circuit by keeping open or opening the respective front wheel inlet valve.

2. The brake system as recited in claim 1, wherein, if the control device discerns or effects that the generator operation of the at least one electric motor is able to effect that the recuperative vehicle deceleration equals the input target vehicle deceleration, the control device is configured to, before or simultaneously with the opening of the respective rear wheel outlet valve, to first close the respective front wheel inlet valve and, later, to open the respective front wheel inlet valve in the case that the front wheel outlet valve of the same brake circuit is in a closed state, and the respective rear wheel outlet valve of the same brake circuit is in an open state.

3. The brake system as recited in claim 2, the control device is configured to open the respective front wheel inlet valve, which is closed before or simultaneously with the opening of the respective rear wheel outlet valve, in the case that the respective front wheel outlet valve of the same brake circuit is in a closed state and the respective rear wheel outlet valve of the same brake circuit is in an open state, as soon as a specified delay has elapsed following the closing of the respective front wheel inlet valve or following the opening of the respective rear wheel outlet valve, or as soon as a measured or estimated pressure in the respective brake circuit is in a normal value range of accumulator chamber pressures prevailing in the respective accumulator chamber.

4. The brake system as recited in claim 1, wherein the brake system is a recuperative brake system having the at least one electric motor and, in the event of the actively input target vehicle deceleration unequal to zero, the control device is configured to discern whether the generator operation of the at least one electric motor is able to effect that the recuperative vehicle deceleration equals the input target vehicle deceleration and, optionally, to drive the at least one electric motor to bring about the input target vehicle deceleration.

5. A method for operating a brake system of a two-axle vehicle comprising a master brake cylinder, a brake actuating element being connected to the master brake cylinder, and at least one brake circuit connected to the master brake cylinder, each of the at least one brake circuit having a respective front wheel brake cylinder, a respective rear wheel brake cylinder, a respective front wheel inlet valve associated with the respective front wheel brake cylinder, a respective front wheel outlet valve associated with the respective front wheel brake cylinder, a respective rear wheel inlet valve associated with the respective rear wheel brake cylinder, a respective rear wheel outlet valve associated with the respective rear wheel brake cylinder, and a respective accumulator chamber disposed downstream of the respective front wheel outlet valve and the respective rear wheel outlet valve, the method comprising the following steps:

detecting a target vehicle deceleration unequal to zero input by a driver of the vehicle by actuating the brake actuating element;

based on the detecting, checking whether a generator operation of at least one electric motor of the vehicle is able to effect that a recuperative vehicle deceleration equals the input target vehicle deceleration;

optionally, opening the respective rear wheel outlet valve to displace a brake fluid pressed out of the master brake cylinder via the respective rear wheel outlet valve into the respectively downstream disposed accumulator chamber; and keeping open or opening the respective front wheel inlet valve when the respective front wheel outlet valve is kept closed or closed, so that a brake pressure prevailing in the respective front wheel brake cylinder is increased and limited to an accumulator chamber pressure actively prevailing in the respective accumulator chamber of the same brake circuit.

6. The method as recited in claim 5, wherein if it is discerned that the generator operation of the at least one electric motor is able to effect that the recuperative vehicle deceleration equals the input target vehicle deceleration, the respective front wheel outlet valve is first closed before or simultaneously with the opening of the respective rear wheel outlet valve and later opened when the respective front wheel outlet valve of the same brake circuit is in a closed state and the respective rear wheel outlet valve of the same brake circuit is in an open state.

7. The method as recited in claim 6, wherein the respective front wheel inlet valve, which is closed before or simultaneously with the opening of the respective rear wheel outlet valve, is opened when the respective front wheel outlet valve of the same brake circuit is in a closed state and the respective rear wheel outlet valve of the same brake circuit is in an opened state, as soon as a specified delay has elapsed following the closing of the respective front wheel inlet valve or following the opening of the respective rear wheel outlet valve, or as soon as a measured or estimated pressure in the respective brake circuit is in a normal value range of accumulator chamber pressures prevailing in the respective accumulator chamber in the respective brake circuit.

8. The method as recited in claim 5, the step of keeping open or opening the respective front wheel inlet valve is executed: (i) cyclically, or (ii) starting from a determination of at least one specified indicator (a) for a non-compliance with a specified minimum utilization of the respective front wheel brake cylinder, or (b) for a deviation of a state of at least one element of the respective front wheel brake cylinder from a normal state.

9. The method as recited in claim 8, wherein, as the at least one specified indicator of a deviation of the state of the at least one element of the respective front wheel brake cylinder from the normal state, it is ascertained whether there is corrosion, or wear, or liquid wetting, or liquid penetration, or glazing, or thermal overstressing, and/or or aging, of the at least one element of the respective front-wheel brake cylinder.

10. The method as recited in claim 8, wherein, as the at least one specified indicator of a deviation of the state of the at least one element of the respective front wheel brake cylinder from the normal state, it is ascertained whether a ratio between an actual friction braking torque of the respective front wheel brake cylinder and an actual brake pressure prevailing in the respective front wheel brake cylinder deviates from a specified normal ratio.

\* \* \* \* \*